United States Patent
Jung et al.

(10) Patent No.: US 7,085,226 B1
(45) Date of Patent: Aug. 1, 2006

(54) CONTROL APPARATUS AND METHOD FOR RELAY NODE DUPLEXING

(75) Inventors: In Chol Jung, Kyoungki-Do (KR); Oh Kuk Gweon, Kyongki-Do (KR)

(73) Assignee: LG Electronics Inc., Seoul (KR)

( * ) Notice: Subject to any disclaimer, the term of this patent is extended or adjusted under 35 U.S.C. 154(b) by 1037 days.

(21) Appl. No.: 09/672,782

(22) Filed: Sep. 29, 2000

(30) Foreign Application Priority Data

Oct. 1, 1999 (KR) ............................... 1999/42422

(51) Int. Cl.
*H01L 1/00* (2006.01)
*H04J 3/14* (2006.01)
*G08C 25/00* (2006.01)

(52) U.S. Cl. ...................... 370/219; 370/220; 370/246
(58) Field of Classification Search ........ 370/216–228, 370/242, 243, 244, 246, 247, 276, 285, 293, 370/413; 714/13, 14
See application file for complete search history.

(56) References Cited

U.S. PATENT DOCUMENTS

| | | | | |
|---|---|---|---|---|
| 4,912,552 A * | 3/1990 | Allison et al. ................ 725/21 |
| 5,123,099 A * | 6/1992 | Shibata et al. ............... 711/120 |
| 5,185,693 A * | 2/1993 | Loftis et al. .................... 700/82 |
| 5,283,782 A * | 2/1994 | Takase et al. ................ 370/219 |
| 5,479,608 A * | 12/1995 | Richardson ..................... 714/4 |
| 5,793,769 A * | 8/1998 | Murono et al. ............. 370/401 |
| 5,802,298 A * | 9/1998 | Imai et al. ................... 709/217 |
| 5,828,823 A * | 10/1998 | Byers et al. .................. 714/24 |
| 6,169,726 B1 * | 1/2001 | Dempsey et al. ........... 370/219 |
| 6,202,170 B1 * | 3/2001 | Busschbach et al. .......... 714/11 |
| 6,327,670 B1 * | 12/2001 | Hellenthal et al. ............. 714/5 |
| 6,487,169 B1 * | 11/2002 | Tada ........................... 370/219 |
| 6,535,479 B1 * | 3/2003 | Ikematsu ..................... 370/220 |
| 6,667,955 B1 * | 12/2003 | Blanc et al. ................. 370/220 |
| 6,690,644 B1 * | 2/2004 | Gorshe ........................ 370/219 |
| 2004/0117687 A1 * | 6/2004 | Smith ........................... 714/13 |

\* cited by examiner

*Primary Examiner*—Hassan Kizou
*Assistant Examiner*—Ahmed Elallam
(74) *Attorney, Agent, or Firm*—Fleshner & Kim LLP

(57) ABSTRACT

The present invention relates to a message transmission system, and more particularly, to a control apparatus and method for relay node duplexing. In the invention, when the exchange of the active node relaying a message by buffering is requested, the duplexing control unit of the active node controls such that the active node performs only the message transmission function, and the duplexing control unit of the standby node controls such that the standby node performs only the message receiving function. When the messages already inputted to the active node before the exchange request are all transmitted, the completion of the exchange is controlled, and when the exchange is completed, the standby node obtains the active right, thereby preventing the loss of a message during the exchange operaiton.

28 Claims, 8 Drawing Sheets

CONTROL APPARATUS AND METHOD FOR RELAY NODE DUPLEXING

BACKGROUND OF THE INVENTION

1. Field of the Invention

The present invention relates to a message transmission system, and more particularly, to a control apparatus and method for relay node duplexing.

2. Description of the Background Art

Generally, in a system for switching messages between processors, such as a system for switching HDLC (High Level Data Link Control) messages between processors and a system for switching ethernet messages between processors, a node system for relaying messages is constructed as a duplex structure in order to provide the stability of system operation.

FIG. 1 is a block diagram of the construction of a system for switching messages between processors.

As shown in FIG. 1, a switching device 200 performs the function of IPC (Inter Processor Communication) between processors 100-1 through 100-n. An U-LINK interface cable for supporting the full-duplex transmission mode is connected between the switching device 200 and the processes 100-1 though 100-n. The switching device 200 is formed in such a manner that a number of modes nodes 230A1–230An and 230B1–230Bn are connected to one D-BUS (switching unit) 210. In addition, each node 230A1–230An and 230B1–230Bn is connected to its respective processor 100-1 through 100-n. And, one processor is connected with 2 nodes.

The switching device 200 is constructed as a redundancy duplex structure wherein a B-side node 200B is in the standby state during the operation of an A-side node 200A. The A-side node 200A receives power from a power supply A 220A, and the B-side node 200B receives power from a power supply B 220B.

The processors 100-1 through 100-n send the same message to both A-side node 200A and B-side node 200B, in order to provide a duplex IPC path.

FIG. 2 is a block diagram of the construction of duplex nodes (230A, 230B) positioned at the switching device 200.

The node A 230A and node B 230B are constructed as the in a redundancy duplex structure. Switching unit 210 switches messages between the nodes and a D-BUS, and the nodes are connected to the processors through a U-LINK. The duplex node A 230A and node B 230B receive messages from the processors through the U-LINK to thus relay the same to the D-BUS, and receives messages from the D-BUS to thus relay the same to the U-LINK. The message through the U-LINK is a 1 bit serial data, and the message through the D-BUS is a number of bits (for example, 8 bits or 16 bit or 32 bits) of parallel data.

The node A 230A and node B 230B performs duplexing function by transmitting a signal (NODE_FAIL) representing that the node cannot be operated any more and a signal (NODE_ACT) informing that the node has an active right to its opposite node. In addition, a power fail signal for informing that there occurs a failure in power supply.

FIG. 3 is a block diagram of the construction of one node.

As shown therein, the node includes a duplexing control unit 234 for controlling redundancy duplexing; a node control unit 233 operated according to the control of the duplexing control unit 234 and for performing message relay function by interfacing by means of a processor and a U-LPK and interfacing by means of the switching unit 210 and a D-BUS, receiving buffer (RX buffer) 232 for buffering a message to be transmitted from the processor to the switching unit 210 according to the control of the node control unit 233, and a transmission buffer (TX buffer) 231 for buffering a message to be transmitted from the switching unit 210 to the processor according to the control of the node control unit 233.

The duplexing control unit 234 receives a power fail signal from the corresponding power supply, and sends and receives a duplexing-related signal (NODE_ACT and NODE_FAIL) to and from the opposite node.

The node control unit 223 includes: and U-LINK interface having an U-LINK transmission interface (UTX interface) 233a for transmitting a message to a processor by means of an U-LINK interface and a U-LINK receiving interface (URX interface) 233a for receiving a message from the processor by means of the U-LINK interface, according to the control of the duplexing control unit 234; and a D-BUS interface having a D-BUS receiving interface (DRX interface) 233c for receiving a message from a switching unit 210 by means of a D-BUS interface and a D-Bus transmission interface (DTX interface) 223d for transmitting a message to the switching unit 210 by means of the D-BUS interface, according to the control of the duplexing control unit 234.

The TX buffer 231 receives a message from the DRX interface 233a, buffers the same, and then transmits it to the UTX interface 233a, according to the control of the DRX interface 233c. The RX buffer 232 receives a message from the URX interface 233b, buffers the same, and then transmits it to the DTX interface 233d, according to the control of the URX interface 233b.

The operation of the thusly described control apparatus for relay node duplexing according to the conventional art will now be described.

When the switching device 200 switches a HDLC message between processors, the duplex node performs the function of relaying the HDLC message. The message inputted into the switching device 200 is formed in a HDLC frame, said HDLC frame is formed to have a predetermined time period between frames. In other words, the node selects a transmission node in which other frames are note received for a predetermined time after receiving one frame, when it receives a HDLC message through the U-LINK or through the D-BUS. In addition, since the HDLC frame has a start flag and a complete flag (end flag) in its structure, the node can know the start and end of the message.

If the node A 230A is in the active node, and the node B B 230B is in the standby node, the node A-230A performs the function of receiving a message from the processor through the U-LINK to transmit the same to the switching unit 210 through the D-BUS, and transmitting a message from the switching unit 210 through the D-BUS to thus transmitting the same processor through the U-LINK. The node B 230B becomes the standby state.

The operation of the node A 230A will be described in more detail (here, to help in understanding, the node as shown in FIG. 3 is assumed to be the node A 230A.). In case of receiving a HDCL message from the processor through the U-LINK, the duplexing control unit 234 of the node A 230A applies an enable signal (URX_ENABLE) to the URX interface 233b. The URX interface 233b applies a signal (RX_START) informing that there is a received message to the RX buffer 232, and stores the received message to the RX buffer 232.

When the message is stored in the RX buffer, the duplexing control unit 234 applies an enable signal (DTX_ENABLE) to the DTX interface 233d. The DTX interface 233d reads the message from the RX buffer 232, and transmits the same to the switching unit 210 through the D-BUS.

On the contrary, when a HDLC message is received from the D-BUS, the duplexing control unit 233c outputs a signal (TX_START) informing that there is a message to be transmitted to the corresponding processor to the TX buffer 231, and stores the message received through the D-BUS in the TX buffer.

When the message is stored in the TX buffer 231, the duplexing control unit 234 applies an enable signal (UTX_ENABLE) from the UTX interface 233a. The UTX interface 233a reads the message from the TX buffer 231, and transmits the same to the processor through the U-LINK.

Afterwards, the node A 230A, e.g., the active node, becomes inoperable, a duplex exchange for translating the node B 230B in the standby mode into the active mode has to be done.

As an example of the occurrence of the inoperable state of the node A 230A, e.g., the active node, when a power fail is occurred, the active right is passed to the node B 230B, e.g., the standby node, and the node A 230A becomes inoperable. The node B 230B translated into the active state starts a message relay function by activating its node control unit.

The inactive node A 230-A stops the message relay function by disabling the node control unit 233.

Therefore, since the conventional control apparatus for relay node duplexing stops the message relay function of the active node, and performs exchange to the standby node, there occurs a problem that the message stored in the buffer of the active node before exchange is lost.

In addition, when the standby node becomes the active state by duplex exchange, it can perform the message relay functions. Thus, there occurs a problem that the message transmitted to the processor or the switching unit is lost during the exchange operation.

SUMMARY OF THE INVENTION

Accordingly, it is an object of the present invention to provide a control apparatus and method for relay node duplexing which prevents the loss of a message relayed during the duplex exchange of the node relaying a message using a buffer.

To achieve the above object, there is provided a control apparatus for relay node duplexing according to the present invention which includes: a duplexing control unit for preventing the loss of a message during exchange time by maintaining only a message transmission function in case of an active node and activating only a message receiving function in case of a standby node, when a node relaying a message by buffering is required to be exchanged, and obtaining an active right at the standby node when the exchange is completed.

To achieve the above object, there is provided a control method for relay node duplexing according to the present invention which includes: a first step of generating a exchange start signal when an active node for relaying a message using a buffer is required to be duplex-exchanged; a second step of performing the preparation for exchange at the active node and the standby node, respectively, when the exchange start signal is generated; a third step of generating a exchange complete signal and becoming inactive, when the preparation for exchange is completed at the active node; and a fourth step of activating the standby node receiving the exchange complete signal is activated to the active state.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will now be described with reference to the accompanying drawings.

Figure 4:
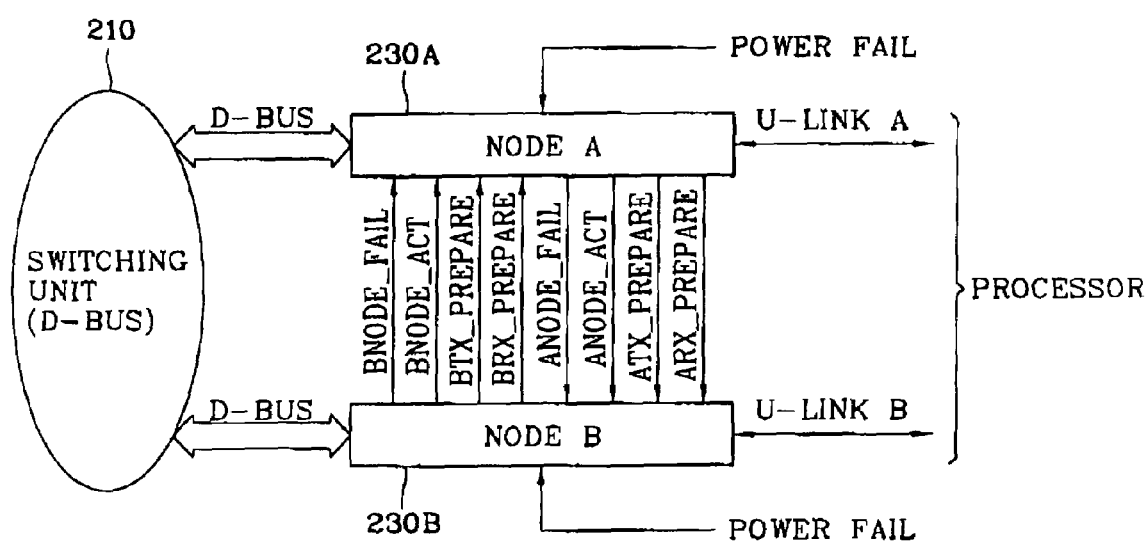
FIG. 4 is a block diagram of the construction of a relay node of a switching device according to the present invention.

First, FIG. 4 is a block diagram of the construction of a relay node of a switching device according to the present invention.

Figure 1:
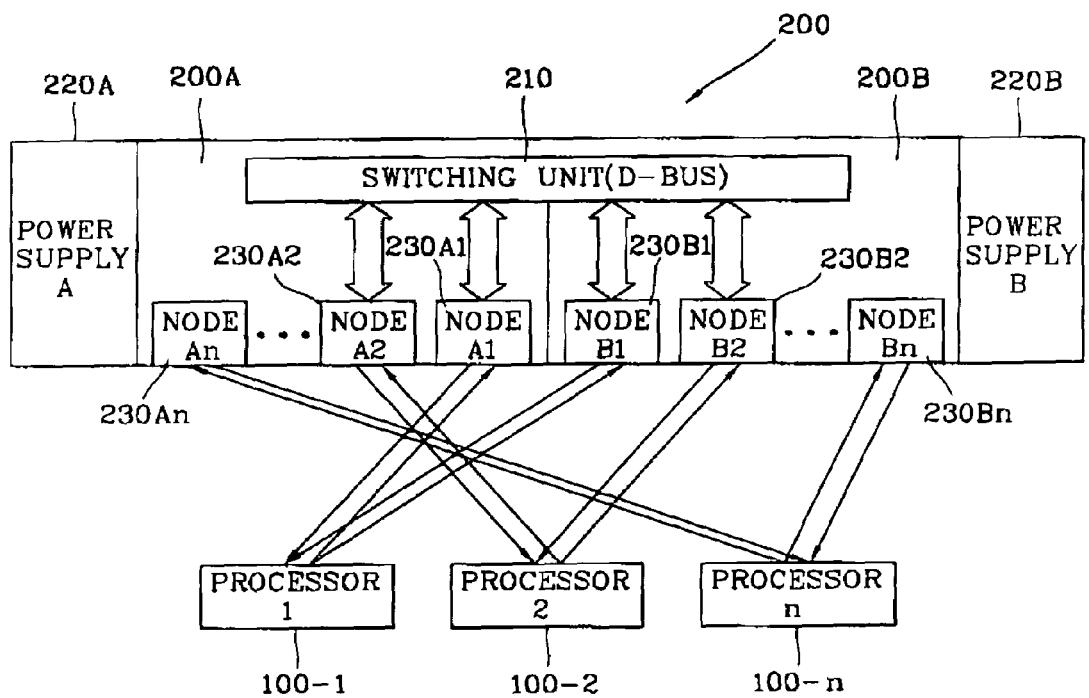
FIG. 1 is a block diagram of an example of the construction of a general system for switching a message between processors.
Figure 2:
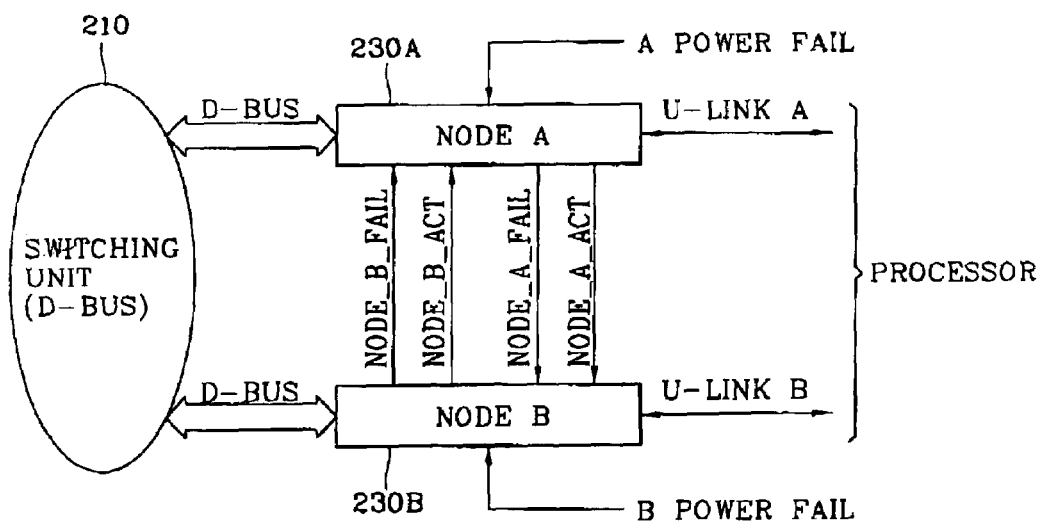
FIG. 2 is a block diagram of the construction of a duplex node positioned at a switching device according to the conventional art.

As shown therein, the switching device according to the present invention has a construction similar to that of the switching device as in FIG. 2. It is different from that as in FIG. 2 in that signals (TX_PREPARE and RX_PREPARE) informing the start of duplex exchange are transmitted from the active node to the standby node, and a message to be relayed during the exchange is processed at the standby node, thereby preventing the loss of a relay message during the exchange.

Figure 5:
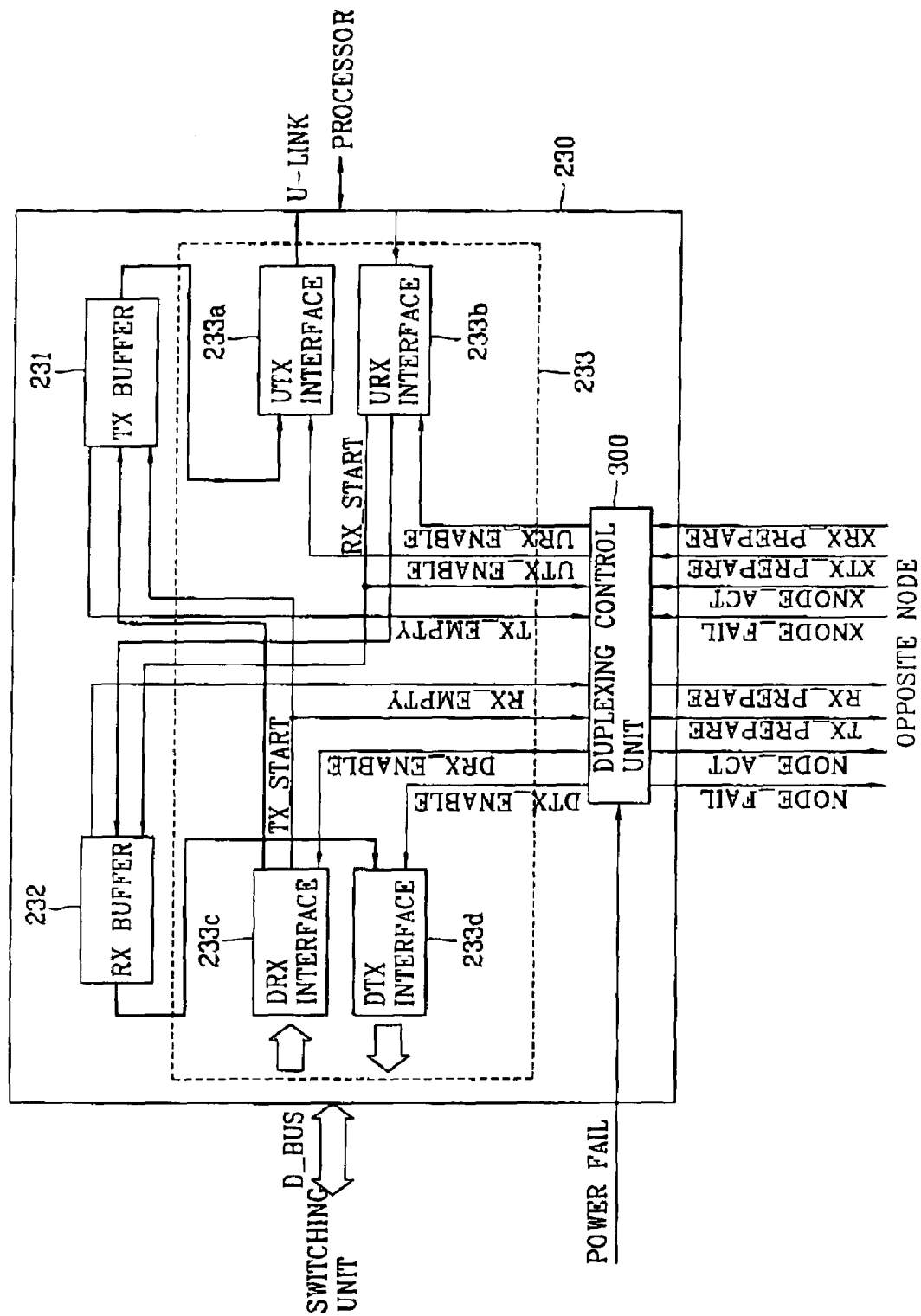
FIG. 5 is a block diagram of the construction of one node of duplex nodes according to the present invention.

FIG. 5 is a block diagram of the construction of one of a plurality of duplex nodes according to the present invention.

Figure 3:
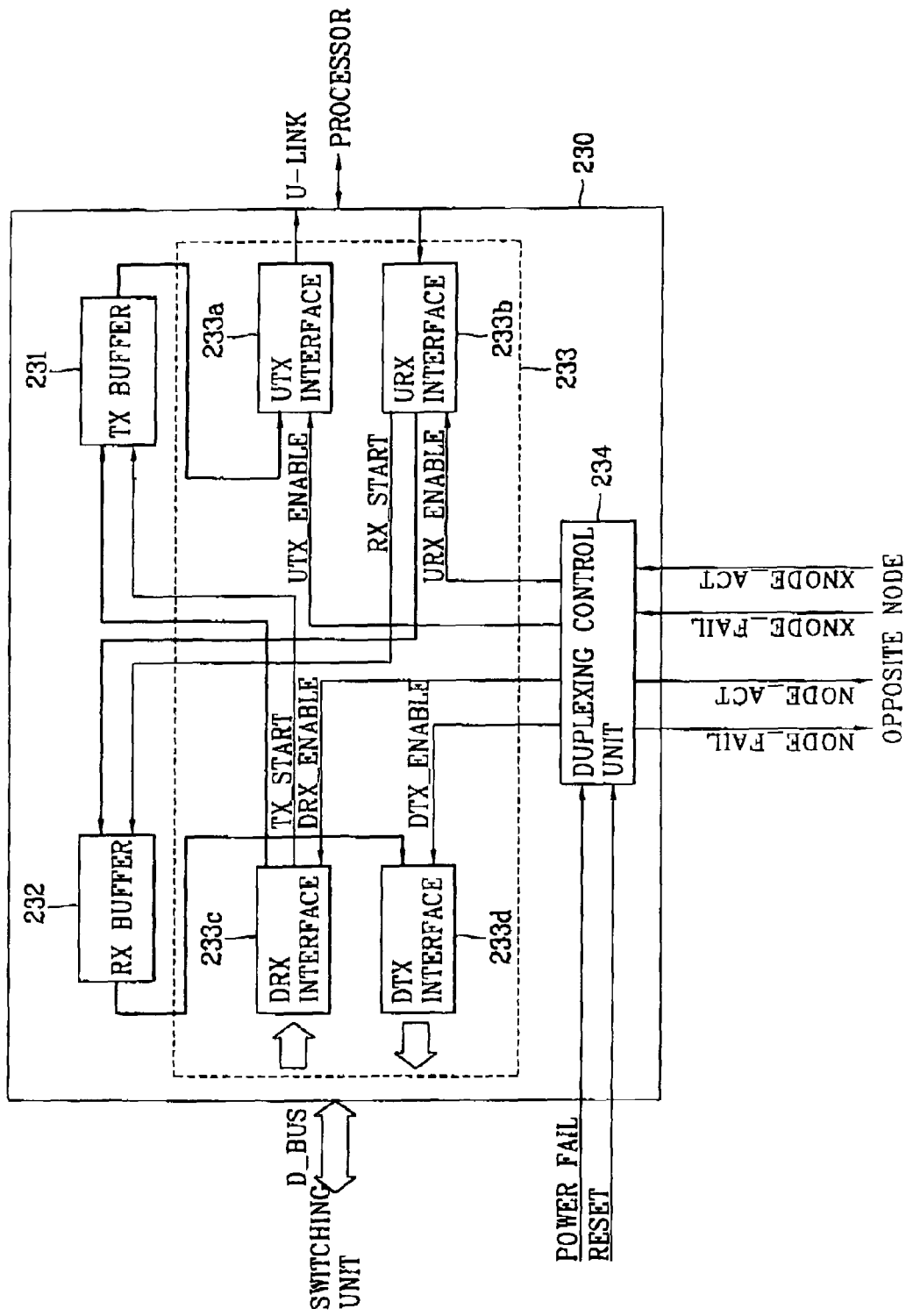
FIG. 3 is a block diagram illustrating the construction of one node according to the conventional art.

As shown therein, the node according to the present invention includes a TX buffer 231, RX buffer 232, node control unit 233, and duplexing control unit 300. The TX buffer 231 performs the same function as the TX buffer 231 as shown in FIG. 3, and it is different from that as in the conventional art in that a signal (TX_EMPTY) informing whether or not there is a message stored in the TX buffer 231 is outputted to the duplexing control unit 300. The RX buffer 232 perform the same function as the RX buffet 231 as shown in FIG. 3, and it is different from that as in the conventional art in that a signal (RX_EMPTY) informing whether or not there is a message stored in the RX buffer is outputted to the duplexing control unit 300. The node control unit 233 is constructed in the same manner as the node control unit 233 as shown in FIG. 3, and it is different from that as in the conventional art in that a signal (TX_START) informing that there is a message to be transmitted from a DRX interface 233c is outputted to not only the TX buffer 231, but also the duplexing control unit 300 and moreover a signal (RX_START) informing that there is a message received from a URX interface 233b is outputted to not only the RX buffer 232, but also the duplexing control unit 300.

In addition, when duplex exchange is requested, the duplexing control unit 300 controls in such a manner that only message transmission is done at the active node, and only message reception is done at the opposite node, during the exchange operation, and passes an active right to the opposite node when the exchange is completed.

This duplexing control unit 300 receives a signal (TX_EMPTY) informing that the buffer outputted from the TX buffer is empty, signal (RX_EMPTY) informing that the buffer outputted from the RX buffer 232 is empty, signal (RX_START) informing that there is a received message outputted from the URX interface 233b, and signal (TX_START) informing that there is a message to be transmitted outputted from the DRX interface 233c. The duplexing control unit 300 receives a power fail signal from the power supply. It receives a signal (XNODE_FAIL) representing that the node cannot be operated anymore, signal (XNODE_ACT) informing that the node has the active right, transmission exchange start signal (TX_PREPARE), and receiving exchange start signal (RX_PREPARE) (Here, the XNODE_FAIL signal is not used.)

In addition, the duplexing control unit 300 outputs a signal (NODE_FAIL) representing that its node cannot be operated any more, signal (NODE_ACT) informing that the node has the active right, transmission exchange start signal (TX_PREPARE), and receiving exchange start signal to the opposite node. An UTX interface enable signal (UTX_ENABLE), URX interface enable signal (URX_ENABLE), DTX interface enable signal (DTX_ENABLE), and DRX interface enable signal (DRX_ENABLE) are outputted to the node control unit 233 of its node.

Figure 6:
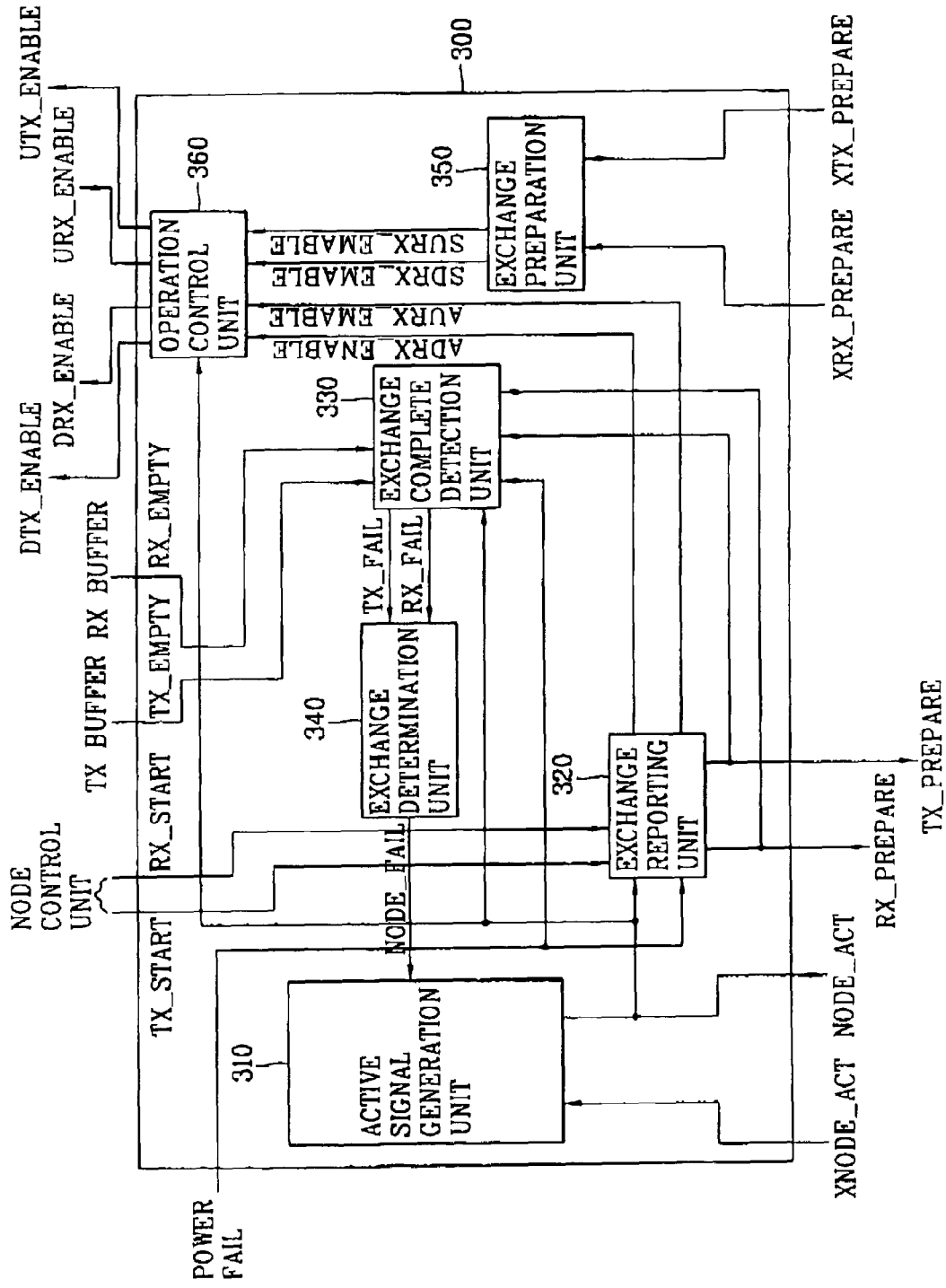
FIG. 6 is a block diagram of the construction of a duplexing control unit according to the present invention.

FIG. 6 is a block diagram of the construction of this duplexing control unit 300.

As shown therein, the duplexing control unit 300 according to the present invention includes: an active signal generation unit 310, exchange reporting unit 320, exchange complete detection unit 330, exchange determination unit 340, exchange preparation unit 350, and operation control unit 360.

The active signal generation unit 310 determines the active right of its node according to the signal (NODE_FAIL) representing that the node cannot be operated any more and the signal (XNODE_ACT) informing that the node has the active right applied from the opposite node.

The exchange reporting unit 320 is a device operated only at the active node, which outputs an exchange start signal (RX_PREPARE) informing the standby node that it has to prepare exchange, when duplex exchange is requested, and outputs active node receiving control signals (ADRX_ENABLE and AURX_ENABLE) for controlling the active node not to receive a message any more, according to the RX_START signal (signal informing that there is a received message) and TX_START signal (signal informing that there is a message to be transmitted) outputted from the node control unit 233.

The exchange complete detection unit 330 detects that the TX buffer and RX buffer of the active node are empty when an exchange start signal is inputted, and outputs a transmission exchange complete control signal and a receiving exchange complete control signal (RX_FAIL) according to the result of the detection.

The exchange determination unit 340 outputs a signal (NODE_FAIL) representing that its node cannot be operated any more according to the transmission exchange complete signal (TX_FAIL) and receiving exchange complete control signal (RX_FAIL) outputted from the exchange complete detection unit 330, for thereby determining exchange.

The exchange preparation unit 350 is a device operated only at the standby node, which generates a standby node receiving control signal (SDRX ENABLE and SURX_ENABLE) for controlling the standby node to receive a message, when exchange start signal (XRX_PREPARE and XTX_PREPARE) are applied from the active node, for thereby preparing exchange.

The operation control unit 360, in case of the active node, generates enable signals (URX_ENABLE, UTX_ENABLE, DRX_ENABLE, and DTX_ENABLE) of the node control unit according to the active node receiving control signals (ADRX_ENABLE and AURX_ENABLE) outputted from the exchange reporting unit 320, and it, in case of the standby node, generates enable signals (URX_ENABLE, UTX_ENABLE, DRX_ENABLE, and DTX_ENABLE) of the node control unit according to the standby node receiving control signal (SDRX_ENABLE and SURX_ENABLE), outputted from the exchange preparation unit 350.

The message relay operation of the relay node according to the present invention is done in the same manner as that of the relay node according to the conventional art. The only difference is that the present invention further includes the operation of outputting signals (TX_EMPTY and RX_EMPTY) informing whether or not there is a message stored in the TX buffer 231 and RX buffer 232 to the duplexing control unit 300, outputting a signal (TX_START) informing that there is a message to be transmitted from the DRX interface 233c of the node control unit 231 to not only the TX buffer 231, but also the duplexing control unit 300, and outputting a signal RX_START informing that there is a message transmitted from the URX interface 233b to not only the RX buffer 232, but also the duplexing control unit 300. This operation is required when duplexing exchange is performed so as to prevent a message loss.

Therefore, the operation of the control apparatus for relay node duplexing according to the present invention will now be described with reference to FIGS. 7 and 8.

Figure 7:
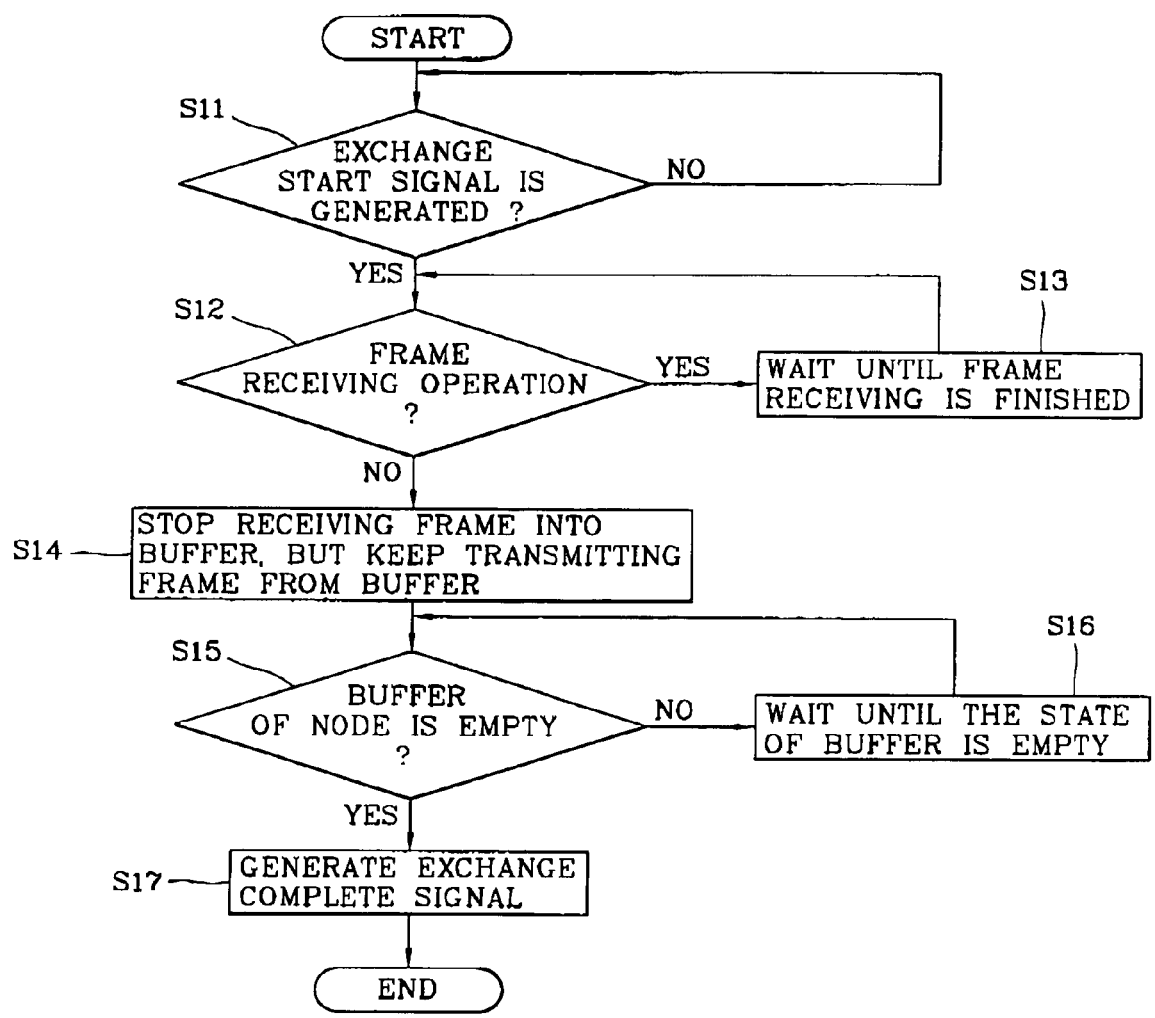
FIG. 7 is a flow chart illustrating a control method for active node duplexing.
Figure 8:
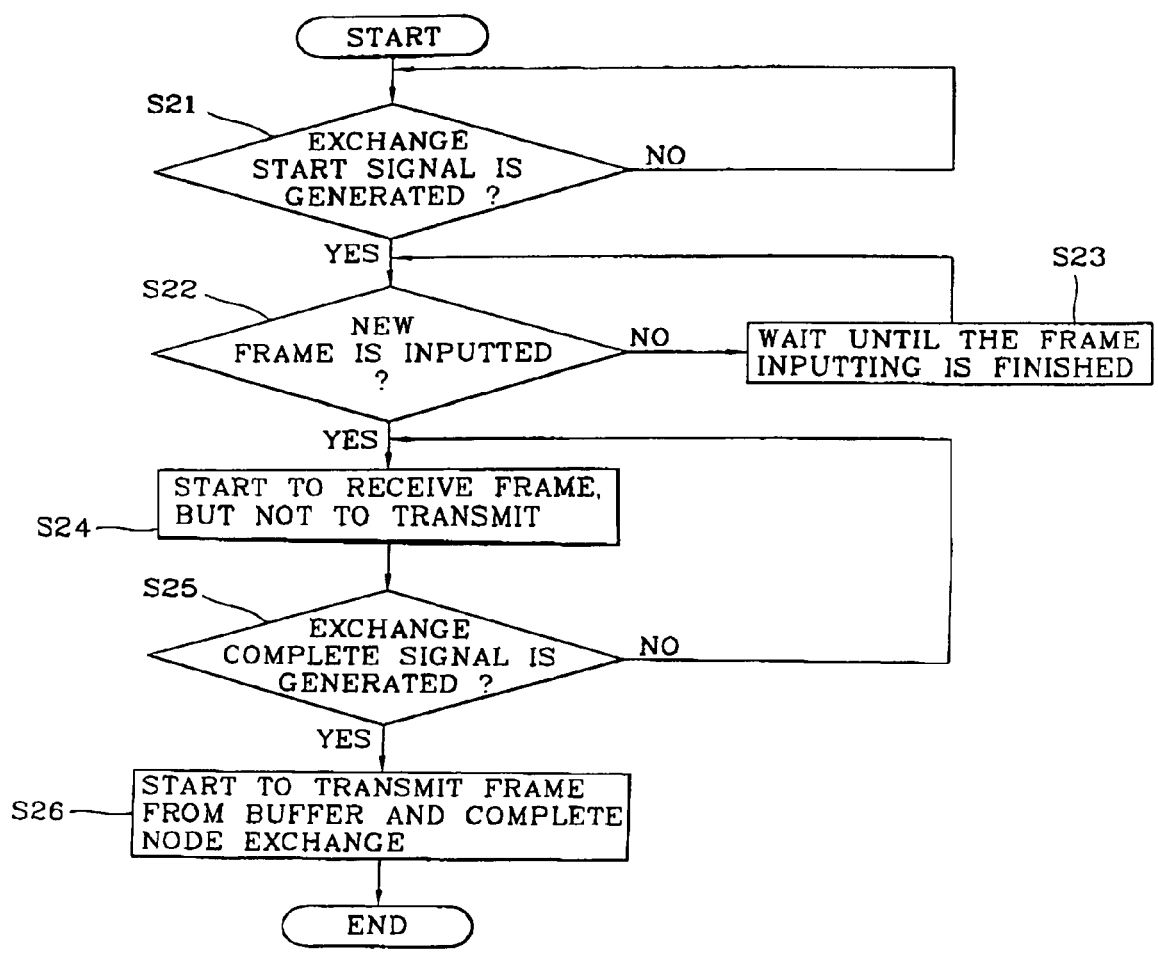
FIG. 8 is a flow chart illustrating a control method for standby node duplexing.

FIG. 7 is a flow chart illustrating a control method for active node duplexing, and FIG. 8 is a flow chart illustrating a control method for standby node duplexing.

First, when a node A 230A operated as active is required to be duplex-exchanged, for example, when a power fail signal is inputted as the on state, the duplexing control unit 300 of the node A 230A controls in such a manner that only message transmission is done at the active node, and only message reception is done at the opposite node, during the exchange operation. And, when the exchange operation is completed after a predetermined time, the active right is passed to the node B 230B.

More specifically, the exchange reporting unit 320 of the duplexing control unit 300 at the node A 230A detects a power fail signal, and outputs an exchange start signal (TX_PREPARE) informing that the next message inputted from the D-BUS is to be received to the node B 230B, if the TX_START signal (signal informing that there is a message to be transmitted) for controlling the activation of the TX buffer 231 is OFF, e.g., if there is no message inputted from the D-BUS to the DRX interface 233c. In addition, if the RX_START signal is off, the RX_PREPARE signal is outputted to the node B 230B in S11, S12, and S13.

At the same time, the exchange unit 320 turns off the active node receiving control signals (ADRX_ENABLE and AURX_ENABLE) so as not to receive a message any more.

Thus, the operation control unit 360 disables the DRX interface 233c and URX interface 233b of the node A 230A upon receipt of the active node receiving control signal of the off state, and keeps the DTX interface 233d and UTX interface 233a of the node A 230A in the previous state in S14. Thus, the node A 230A turns into the state where message receiving is stopped, and message transmission is maintained in S14, for thereby making the message stored in the TX buffer 231 and RX buffer 232 of the node A 230A to be transmitted to a processor or switching unit.

When an exchange start signal is turned on, the exchange complete detection unit 330 is operated to thus detect the message storing state of the TX buffer 231 and RX buffer 232.

Meanwhile, the exchange preparation unit of the duplexing control unit at the node B 230B prepares exchange so that the node B 230B performs only message transmission when an exchange preparation is reported from the node A 230A in S21, S22, and S23. In other words, when exchange start signals (XRX_PREPARE and XTX_PREPARE) are applied from the node A 230A, the exchange preparation unit of the node B 230B generates standby node receiving control signals (SDRX_ENABLE and SURX_ENABLE) as the on state to output the same to the operation control unit so that the node B 230B performs only message receiving.

The operation control unit at the node B 230B having received the standby node control signals (SDRX_ENABLE and SURX_ENABLE) of the on state turns on an enable signal (DRX_ENABLE) for activating the DRX interface and an enable signal (URX_ENABLE) for activating the URX interface for thereby outputting the same. Thus, the message transmitted from the processor or message transmitted from the switching unit are received into the DRX interface and the URX interface, and stored in the TX buffer and the RX buffer in S24.

At this time, since the operation control unit of the node B 230B does not turn on an enable signal (DTX_ENABLE) for activating the DTX interface and an enable signal (UTX_ENABLE) for activating the UTX interface, it does not perform message transmission, but message receiving alone during the exchange operation in which an exchange start signal is generated and an exchange complete signal is not generated. Therefore, the message inputted into the duplex node during the duplex exchange is received not by the node A 230A, but by the node B 230B, for thereby preventing a message loss during the exchange operation.

Meanwhile, at the node A 230A, the DTX interface 233d and the UTX interface 233a are enabled, and the DRX interface 233c and the URX interface 233b are disabled, The message stored in the TX buffer 231 and RX buffer 232 right before the start of the exchange is transmitted. Thus, when the TX buffer 231 and the RX buffer 232 becomes empty, TX_EMPTY and RX_EMPTY signals for informing that the buffers are empty are outputted as the on state in S15 and S16. Then, when the exchange complete detection unit 330 of the duplexing control unit 300 detects that the TX buffer 231 is empty, it outputs a transmission exchange complete signal (TX_FAIL) of the on state to the exchange determination unit 340. In addition, when the duplexing control unit 300 detects that the RX buffer 232 is empty, the exchange complete detection unit 330 outputs a receiving exchange complete control signal (RX_FAIL) of the on state to the exchange determination unit 340.

The exchange determination unit 340 outputs a NODE_FAIL signal representing that the node A 230A cannot be operated any more, when the TX_FAIL signal and the RX_FAIL signal are all in the on state, to the active signal generation unit 310.

When the NODE_FAIL signal is applied, the active signal generation unit 310 gives up the active right of the node A 230A by turning off the NODE_ACT signal, e.g., the exchange complete signal, for thereby outputting the same to the node B 230B. When the exchange complete signal is generated, the exchange reporting unit 320 reports the completion of the exchange to the operation control unit 360. The operation control unit 320 having been reported for the completion of the exchange disables the UTX interface 233a, URX interface, DRX interface 233c, and DTX interface 233d in S17.

Meanwhile, the node B 230B having received the XNODE_ACT signal (NODE_ACT signal of the off state outputted from the node A 230A) acquires the active right in S25. Then, the exchange reporting unit of the node B 230B outputs an ADRX_ENABLE signal and an AURX_ENABLE signal in the on state so that the node B 230B can transmit and receive a message. Thus, the operation control unit enables message transmission and receiving by activating the node control unit of the node B 230B, thereby completing the exchange in S26.

For reference, the initial value of each signal before the occurrence of the exchange is as follows.

At the active node, TX_PREPARE is OFF, RX_PREPARE is OFF NODE_ACT is ON, XNODE_ACT is OFF, XRX_PREPARE is OFF, XTX_PREPARE is OFF, NODE_FAIL is OFF, and the signals of TX_START, RX_START, TX_EMPTLY, and RX_EMPTY are unknown.

At the standby node, TX_PREPARE is OFF, RX_PREPARE is OFF, NODE_ACT is OFF, XNODE_ACT is ON, XRX_PREPARE is OFF, XTX_PREPARE is OFF, and NODE_FAIL is OFF. In addition, TX_EMPTY is ON and RX_EMPTY is ON since the buffer does not receive a message at the standby node, and TX_START and RX_START signals are unknown.

Figure 9:
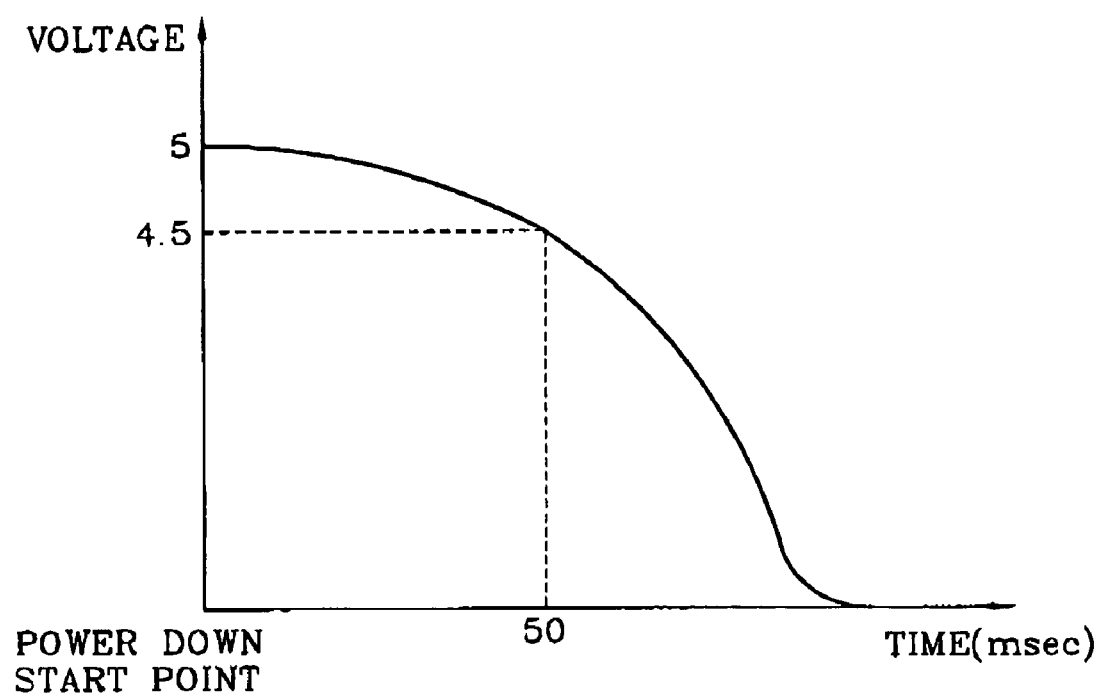
FIG. 9 is a view illustrating a voltage drop due to the power down of a power supply.

FIG. 9 illustrates a voltage drop according to the lapse of time in case of power down, one of duplex exchange requirements of a relay node.

Since the power supply according to the present invention has the function of voltage charging, it can stably supply power for a predetermined time (it must be longer than the period of time between the power down and the duplex exchange completion, and it must be longer than the period of time taken for transmission of all messages stored in the TX buffer and RX buffer of the node. That is, for a period of time between scores of msecs and hundreds of msecs). In other words, the power supply can supply a stable voltage to the relay node for a predetermined time even after generating a power fail signal.

As described above, in the control apparatus and method for relay node duplexing, there is an effect of preventing a message loss during duplex exchange by preparing for the exchange after generating an exchange start signal during the exchange operation of a duplex node relaying a message using a buffer, and generating an exchange complete signal when the exchange preparation is completed, for thereby completing the exchange.

That is, when a duplex exchange is requested, it is controlled in such a manner that an exchange start signal is generated at the active node, and the receiving function is stopped and the transmission function is kept at the active node, thus preventing a message already stored in the buffer of the active node before the exchange from being lost due to the exchange. In addition, it is controlled in such a manner that transmission is not activated, and receiving is possible at the standby node, for thereby preventing a message loss.

In addition, the active node continues to check the state of its buffer and transmits all messages stored in the buffer during the exchange operation. Thereafter, the active node generates an exchange complete signal and disables its message transmission/receiving function, thereby passing the active right to the standby node. The standby node activates its message transmission/receiving function to thus obtain the active right upon receipt of the exchange complete signal, thereby achieving a stable duplex exchange.

Moreover, during the duplex exchange of the node relaying a message using the buffer, as the size of the buffer grew larger, the effect of preventing a message loss becomes larger.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for relay node duplexing, comprising:
a duplexing control unit which maintains a message transmission function and disables a message receiving function of an active node and initiates a message receiving function of a standby node during a duplex exchange operation performed in response to a failure condition, and which transfers an active right signal to the standby node when the duplex exchange operation is completed, wherein the duplexing control unit comprises:
an active signal generation unit for generating the active right signal;
an exchange reporting unit for informing the standby node to prepare for a duplex exchange, when duplex exchange is requested, and controlling the active node not to receive a message any more;
an exchange complete detection unit for detecting a message storing state of a TX buffer and an RX buffer of the active node when preparation for the duplex exchange is reported, and controlling completion of the exchange according to a result of the detection;
an exchange determination unit for determining the completion of the exchange according to the control of the exchange completion of the exchange complete detection unit and outputting a result of the determination to the active signal generation unit;
an exchange preparation unit for preparing for the exchange by controlling the message receiving of the standby node when the exchange preparation is reported from the active node; and
an operation control unit for controlling the operation of the message receiving of the standby node according to the control of the exchange reporting unit and exchange preparation unit.

2. The apparatus of claim 1, wherein the control unit further maintaining a message transmission function of the standby node in a disabled state during the duplex exchange operation.

3. The apparatus of claim 2, wherein a buffer of the active node is emptied of messages when the message transmission function is maintained, and a buffer of the standby node receives a new message when the message receiving function is maintained.

4. The apparatus of claim 2, wherein the message comprises a HDLC frame and an ethernet frame.

5. The apparatus of claim 1, wherein the exchange reporting unit controls the operation control unit so that the message transmission function of the active node is disabled when the active signal generation unit generates the active right signal for transfer to the standby node.

6. The apparatus of claim 1, wherein the exchange reporting unit controls the operation control unit so that a message transmission function of the standby node is activated, when the active signal generation unit generates the active right signal for transfer to the standby node.

7. The apparatus of claim 1, wherein the operation control unit disables the message transmission function of the active node according to the control of the message transmission inactivation by the exchange reporting unit, and enables the message receiving function of the standby node according to the control of the message receiving activation of the exchange preparation unit.

8. The apparatus of claim 1, wherein, if the duplex exchange operation is performed in response to a power fail signal, the active node is supplied with a stable voltage for a predetermined time by the power supply even after the occurrence of power down.

9. The apparatus of claim 8, wherein the predetermined time is longer than a time period between the power down and the generation of a duplex exchange complete signal.

10. The apparatus of claim 8, wherein the power supply supplies supply power to the active node for the predetermined time even after the power down as a result of a voltage charging function.

11. A control method for relay node duplexing, comprising:
generating an exchange start signal for at least one of an active node and a standby node when a duplex exchange operation is performed in response to a failure condition;
performing preparation for exchange between the active node and the standby node, respectively, when the exchange start signal is generated;
generating an exchange complete signal and setting the active node to an inactive state, when the preparation for exchange is completed at the active node; and
activating the standby node when the exchange complete signal is received by the standby node, wherein said preparation performing includes:
stopping a message receiving function and keeping a message transmission function at the active node;
transmitting a message already stored in a buffer of the active node before start of the duplex exchange;
activating a message receiving function at the standby node based on the exchange start signal, and
receiving a message for storage in a buffer of the standby node during the duplex exchange operation.

12. The method of claim 11, wherein the standby node having received the exchange complete signal becomes active by activating a message transmission function for thereby completing the exchange.

13. The method of claim 11, wherein the message comprises a HDLC frame and an ethernet frame.

14. The method of claim 11, wherein the active node is supplied with a stable power for a predetermined time after power down, if the duplex exchange operation is performed in response to a power fail signal.

15. The method of claim 14, wherein the predetermined time is longer than a time period between the power down and generation of the exchange complete signal.

16. A method for relay node duplexing, comprising:
generating an exchange start signal for at least one of an active node and a standby node when a duplex exchange operation is performed in response to a failure condition;
performing preparation for exchange between the active node and the standby node, respectively, when the exchange start signal is generated;
generating an exchange complete signal and setting the active node to an inactive state, when the preparation for exchange is completed at the active node; and
activating the standby node when the exchange complete signal is received by the standby node, wherein generating the exchange complete signal comprises:
detecting a state of a buffer at the active node; and
generating the exchange complete signal, if the buffer is determined to be empty as a result of the detected state.

17. An apparatus, comprising:
a detection unit which detects a status signal indicative of a failure condition; and
a control unit which maintains a message transmission function and disables a message receiving function of an active node and which activates a message receiving function and disables a message transmission function of a standby node during a duplex exchange operation initiated in response to the status signal, wherein the active node includes a transmission buffer and a receive buffer, each of which outputs a status signal to the control unit indicating that a respective one of the buffers is empty.

18. The apparatus of claim 17, wherein the status signal indicates occurrence of a power failure of the active node.

19. The apparatus of claim 17, wherein at least one of the transmission buffer and the receive buffer of the active node is emptied during a period when the message transmission function is maintained.

20. The apparatus of claim 19, wherein all messages stored in the transmission buffer are transmitted to another second buffer.

21. The apparatus of claim 20, wherein said another buffer is located at the standby node.

22. The apparatus of claim 17, wherein the active node transmits one or more prepare signals to the standby node indicating the start of a duplex exchange operation.

23. The apparatus of claim 22, wherein the message receiving function of the standby node is activated and the message transmitting function of the standby node is disabled based on said one or more prepare signals.

24. The apparatus of claim 22, wherein the control unit is included with the active node and outputs said one or more prepare signals.

25. An apparatus, comprising:
a detection unit which detects a status signal indicative of a failure condition; and
a control unit which maintains a message transmission function and disables a message receiving function of an active node and which activates a message receiving function of a standby node during a duplex exchange operation initiated in response to the status signal, wherein the active node includes:
an interface coupled to a signal line; and
a message buffer coupled to the interface, wherein disabling the message receiving function includes disabling a message receiving capability of the interface, and wherein at least one message stored in the buffer is sent to the signal line through the interface while the message transmitting function is maintained.

26. The apparatus of claim 25, wherein all messages stored in the buffer are sent to the signal line through the interface while the message transmitting function is maintained.

27. The apparatus of claim 25, wherein the signal line is coupled to a message buffer in the standby node.

28. An apparatus for relay node duplexing, comprising:
a duplexing control unit which maintains a message transmission function and disables a message receiving function of an active node and initiates a message receiving function of a standby node during a duplex exchange operation performed in response to a failure condition, and which transfers an active right signal to the standby node when the duplex exchange operation is completed, wherein the active node includes a transmission buffer and a receive buffer, each of which outputs a status signal to the control unit indicating that a respective one of the buffers is empty.

* * * * *